United States Patent [19]

Lai et al.

[11] Patent Number: 5,251,230
[45] Date of Patent: Oct. 5, 1993

[54] RESONANT CAVITY DITHER WITH INDEX OF REFRACTION MODULATOR

[75] Inventors: Ming Lai, Encinitas, Calif.;
Jean-Claude M. Diels, Albuquerque, N. Mex.

[73] Assignee: Honeywell, Inc., Minneapolis, Minn.

[21] Appl. No.: 880,426

[22] Filed: May 8, 1992

[51] Int. Cl.⁵ .............................................. H01S 3/083
[52] U.S. Cl. .................................. 372/94; 372/25; 372/18; 372/12; 372/29; 372/26
[58] Field of Search ................... 372/94, 10, 43, 12, 372/25, 53, 45, 41, 26, 18, 29

[56] References Cited

U.S. PATENT DOCUMENTS

| | | | |
|---|---|---|---|
| 4,135,822 | 1/1979 | Ezekiel | 356/350 |
| 4,700,150 | 10/1987 | Hall et al. | 372/32 |
| 4,923,299 | 5/1990 | Anderson et al. | 372/94 |

OTHER PUBLICATIONS

Lai, et al., Interference Between Spontaneous Emission in Different Directions, Aug. 10, 1989, pub. Jan. 29, 1990.
Christian, et al., Picosecond Pulsed Diode Ring-Laser Gyroscope Jul. 3, 1991.
Delfyett, et al., Generation of Subpicosecond High-Power Optical Pulses from a Hybrid Mode-Locked Semiconductor Laser Oct. 9, 1990.
Raja, et al., Novel Wavelength-Resonant Optoelectronic Structure and Its Application to Surface-Emitting Semiconductor Lasers Jun. 27, 1988.

Primary Examiner—Léon Scott, Jr.
Attorney, Agent, or Firm—Mark J. Gebhardt

[57] ABSTRACT

A laser gyro having a laser source for providing laser energy includes a laser gain device for receiving lasing energy and generating first and second counterpropagating laser pulses along a common optical path. A detector detects at least one of the pulses and generates an index of refraction control signal representative of the detected at least one laser pulse. The index of refraction of a segment of the optical path is varied in response to the index of refraction control signal such that the index of refraction of the segment of the optical path changes an optical path length for one of the laser pulses. A detector senses the beatnote between the first and second counterpropagating laser pulses.

17 Claims, 5 Drawing Sheets

RESONANT CAVITY DITHER WITH INDEX OF REFRACTION MODULATOR

The present invention relates generally to ring laser sensors, including rotation sensors, laser gyros, fluid velocity sensors and magnetic field sensors. In this context, the invention provides a laser gyro including a resonant cavity dither with index of refraction modulator.

BACKGROUND OF THE INVENTION

The present invention exploits principles discovered by the inventors in investigating the gyroscopic response of a femtosecond ring dye laser operating on a rotating platform. The investigation was carried out at the University of New Mexico Physics and Astronomy Department. Expected advantages of a mode-locked laser gyro over a conventional CW laser gyro include smaller coupling between the two counterpropagating waves and the absence of mode competition in a homogeneously broadened gain medium. Both features are a result of the fact that the two counterpropagating pulses in a passively mode-locked laser cavity only meet at two points, both outside of the gain medium. However, in a passively mode-locked laser, a strong coupling between two counterpropagating waves establishes the crossing point between the two pulses. It is therefore logical to expect that this same coupling may result in a lock-in of the gyro response.

It is well known in the art that a propagating light pulse will experience a path length that is proportionate to the index of refraction of the optical medium in which it is traveling. The present invention exploits this phenomenon to avoid a lock-in of the gyro response.

It is therefore a motive of the invention to avoid the lock-in of a laser gyro using a resonant cavity dither with index of refraction modulator.

SUMMARY OF THE INVENTION

A laser gyro having an index of refraction modulator in the optical path of the laser is provided. The index of refraction modulator in the optical path of the laser gyro modulates the pulse train traveling through the optical waveguide. The modulation is controlled by a selective modulation signal to vary the effective optical path length of the laser. The optical path length is varied such that the opposite traveling pulses do not pass through an absorber in the optical path length at the same frequency. This avoids cross coupling between opposite traveling pulses. Modulators created from a crystal, either an electro-optical crystal or a semiconductor, vary the index of refraction in response to the pulses. The synchronization of the index of refraction is obtained through optical or electronic delays. An avalanche photodiode detector is included which may also be integrally connected to the crystal.

DESCRIPTION OF THE PREFERRED EMBODIMENT

Figure 1:
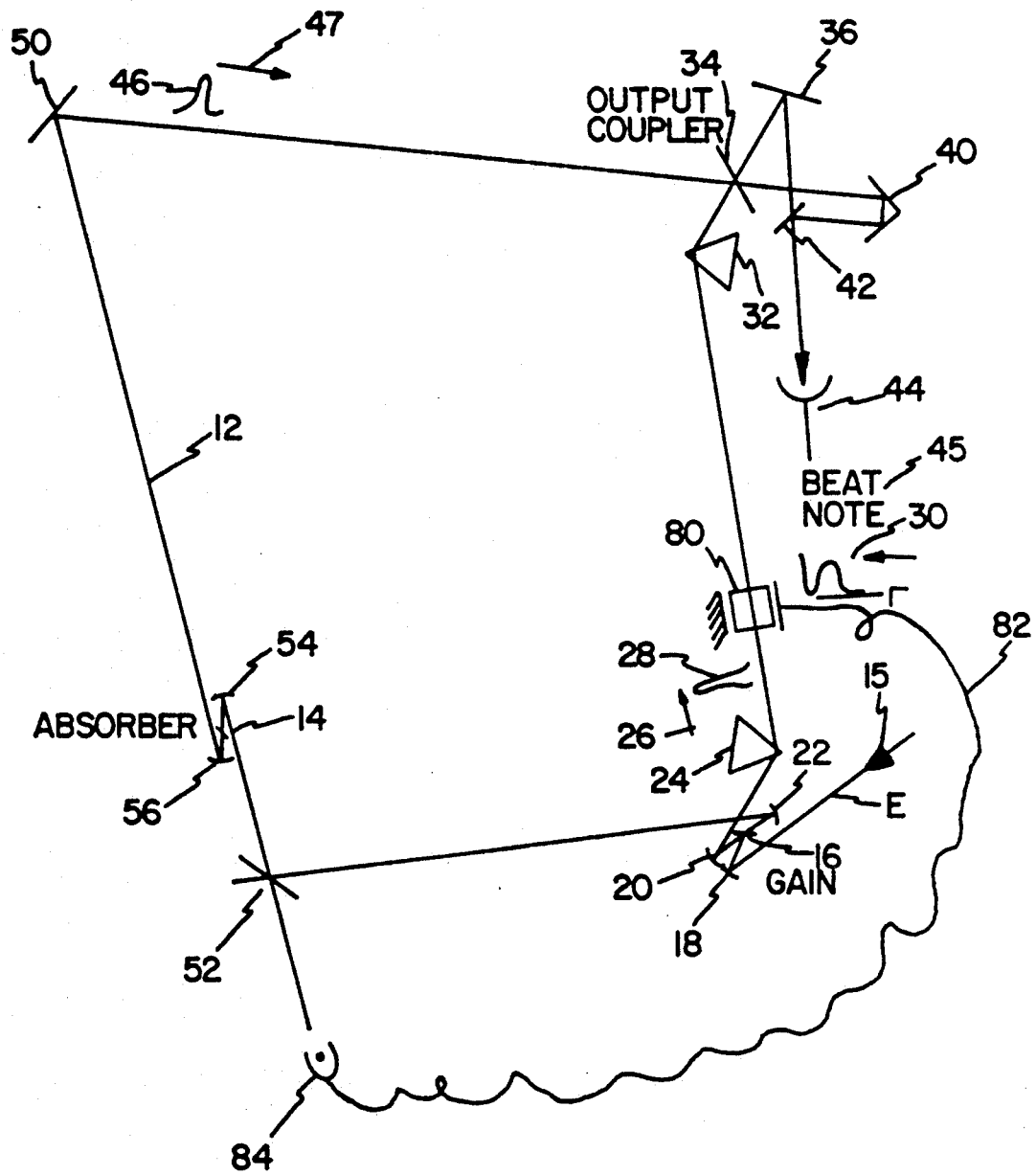
FIG. 1 shows schematically a laser gyro including a mechanism for varying the index of refraction of the optical path as employed in one embodiment of the invention.

Referring now to FIG. 1 which shows a schematic diagram of the apparatus of the invention to provide a resonant cavity dither for a laser gyro with index of refraction modulator. The laser gyro 10 includes a gain medium 16. The gain medium 16 can optionally receive lasing energy from lasing energy source 15. The gain medium 16 provides two counterpropagating pulses. Pulse one 28 propagates in a direction indicated by arrow 26 along optical path 12. Pulse two 46 propagates in a direction indicated by arrow 47 along optical path 12. Waveguides 20 and 22 provide the proper directional steering to beam pulses to mirror 52, then to absorber 14. Absorber 14 then provides pulses to mirror 50 through waveguides 56 and 54.

In one preferred embodiment of the invention the absorber can optionally be a multiple quantum well device. This device in combination with laser gain medium 16 provides high frequency narrow pulses. A good description of the generation of subpicosecond high power optical pulses from hybrid mode lock semiconductor laser can be found in an article entitled "Generation of Sub-picosecond High Power Optical Pulses From A Hybrid Mode-Locked Semiconductor Laser", by P. J. Belfyett, C. H. Lee, L. T. Florez, N. G. Stofffel, D. J. Gmittern, N. C. Andreadakis, G. A. Alphonsen, and J. C. Connolly, therefore Optical Letters, Vol. 15, No. 23, Dec. 1, 1990, pages 1371-1373. The authors discuss an ultra short optical pulse in the order of 0.46 picoseconds in duration with over 70 watts of peak power. The pulses are generated from an all semiconductor laser diode system. The use of the multiple quantum well device is discussed in the above-referenced paper.

Once generated, the pulses 46 and 28 are directed by mirror 50 in one direction along optical path 12 to output coupler 34. Output coupler 34 then directs pulse two 46 to corner mirror 40 which directs it to mirror 42 and subsequent detector 44. In the opposite counter-rotating direction pulse one 28 is sent first through a prism 24 to shorten the pulse using techniques well known in the art. The prism then directs the shortened pulse to an index of refraction modulator 80. Pulse one 28 then propagates through a second prism 32 to be further narrowed and shortened, then progresses through output coupler 34 to mirror 36 through mirror 42 to detector 44. At detector 44 two pulses interfere to create beat note 45. The gyroscopic response of the laser gyro 10 is detected by detector 44 as beat note 45. With the index of refraction modulator 80 statically set at one index of refraction, the laser gyro 10 will lock-in at low relative rotation rates.

The invention includes an index of refraction modulator 80 which changes the optical path length of one of the propagating pulses. In this embodiment of the invention pulse one 28 will propagate through the index of refraction modulator 80 when the index of refraction modulator has a higher index of refraction. This is controlled by the synchronized existence of a similar timed pulse occurring at detector 84. The laser path 12 is extended through mirror 52 through detector 84 where the existence of a pulse on detector 84 will propagate through, in this case the wire 82, as an electrical signal and modulate the index of refraction modulator 80 in response to the pulse signal 30. The timing of the control pulse 30 along signal line 82 in one preferred embodiment of the invention may be adjusted by varying the length of the interconnect wire 82. Also, the distance between the detector 84 and the mirror 52 may be adjusted. Those skilled in the art will recognize that other sensing mechanisms may be used to sense the existence of the pulse along the optical path.

The index of refraction modulator 80 can be alternately a Pockel cell which is well known in the art. Lock-in of the two signals is avoided by choosing the index of refraction bias great enough such that the beat note 45 is much above the lock-in rate. Thus, when the Pockel cell 80 is at a higher index of refraction the net effective path length of pulse one 28 is increased thereby avoiding lock-in.

Figure 2:
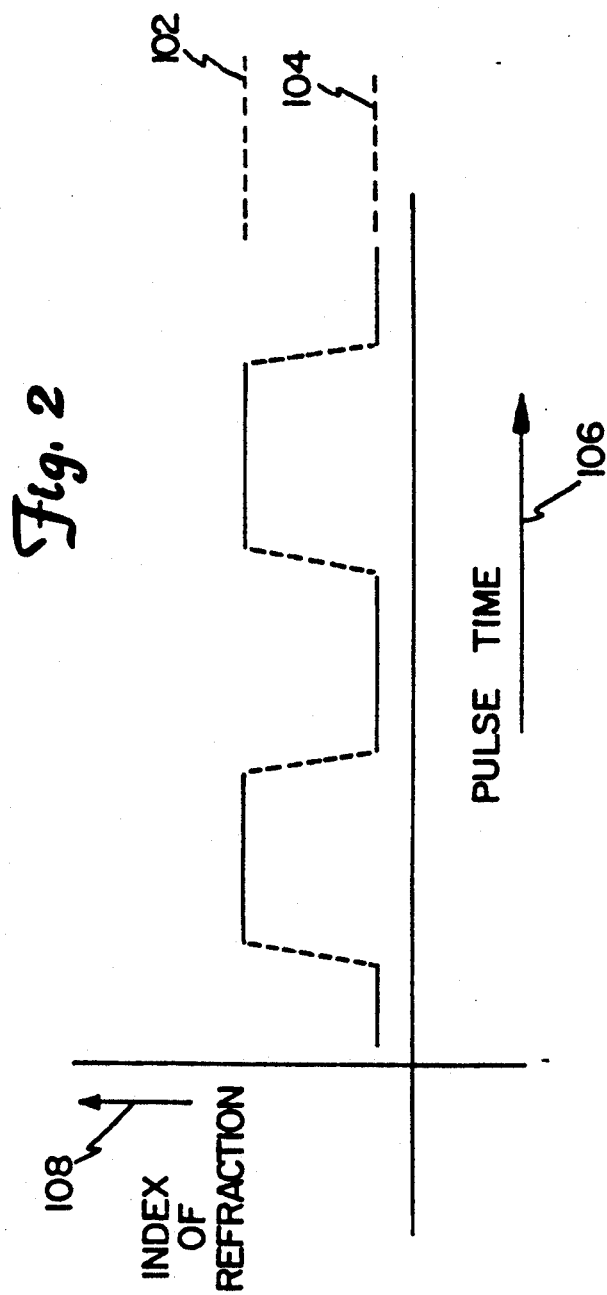
FIG. 2 schematically shows a plot of index of refraction versus time.

Now referring to FIG. 2 which shows the relationship of the index of refraction to pulse time. Along the X axis pulse time 106 is shown as the increasing time of pulse propagation for the laser gyro 10. On the Y axis the index of refraction 108 is shown as two levels, the inactive level 104 and the active level 102. When the index of refraction modulator is inactive the effective path length is short. When the index of refraction modulator 80 is activated the effective path length is lengthened.

The gyroscopic response or scale factor $\Re$ of a ring laser is the ratio of the beat note $\Delta\nu$ (in Hz) between the counterpropagating modes in the laser, to the rotation rate $\Omega$ (in radian/s) of the laser support. In the case of a femtosecond (fs) laser, accurate delay lines have to be used to make the pulse trains corresponding to the two opposite senses of rotation interfere on the detector 44.

A beat note between the two fs-pulse trains is readily, understood in the frequency domain. Each pulse train 28 and 46 corresponds to a comb of equally spaced spectral lines which are called laser modes. The spectral combs of the two pulse trains are identical but shifted with respect to each other by a small amount due, for example, to a rotation of the laser gyro 10. The beat note is a measure of the relative shift between the two spectral combs. If A is the ring laser area, P its parameter and $\lambda$ the wavelength, the gyroscopic response is given by:

$$\Delta\nu = \frac{4A}{P\lambda} \Omega = \Re \Omega \qquad (1)$$

Figure 3:
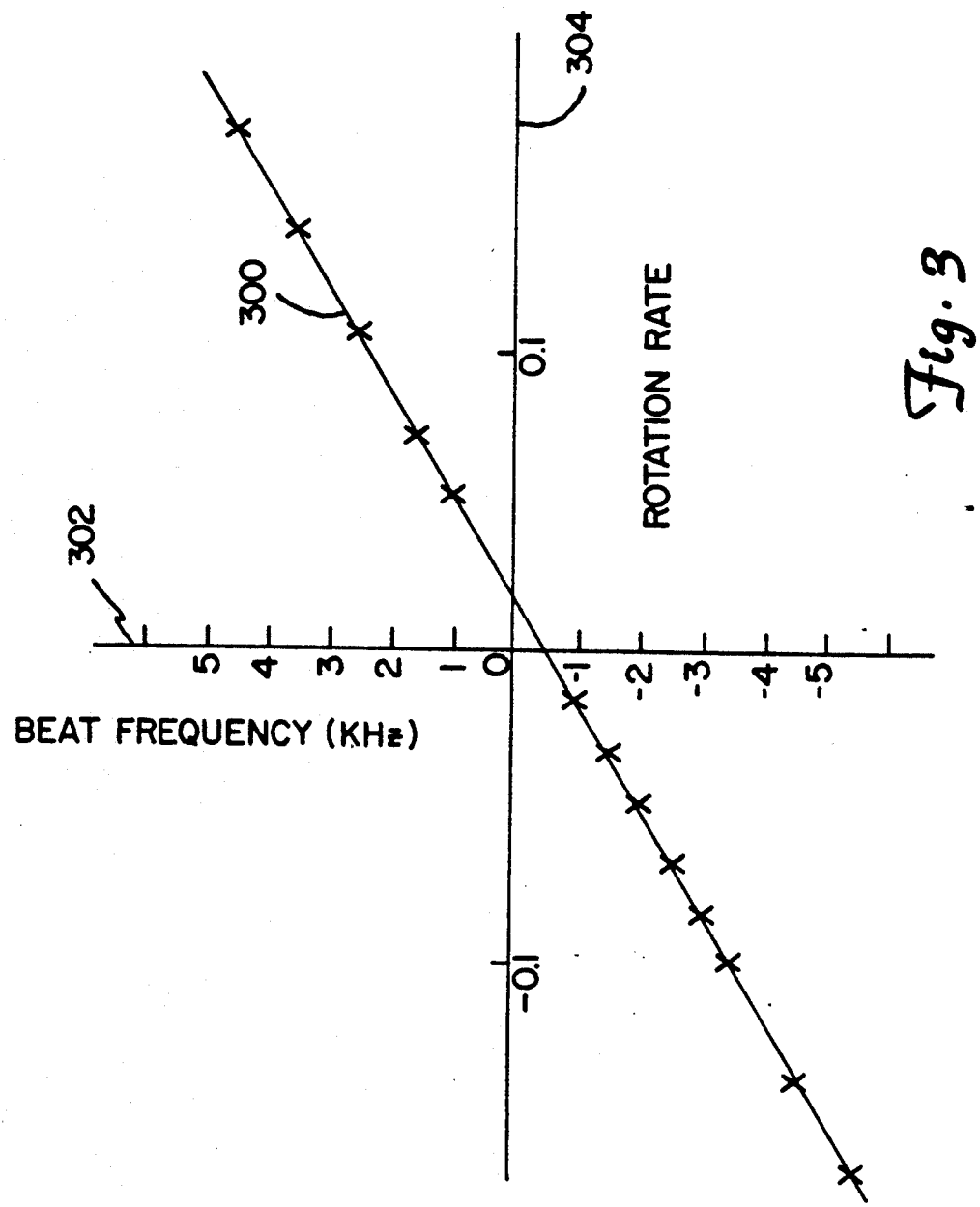
FIG. 3 shows a plot of beat frequency versus rotation rate of a laser gyro.

The gyro response of the mode-locked laser of the invention is shown in FIG. 3. FIG. 3 shows a plot 300 of the beat frequency on abscissa 302 versus the rotation rate on ordinate 304. The pulse duration is about 100 fs. The beat frequency 45 is obtained by overlapping the two pulse trains 46 and 28 temporally and spatially on a slow photodiode 44 via an extracavity delay, as shown in FIG. 1. The data confirm the absence of measurable dead band noted on measurement of Fresnel drag. By careful alignment of the laser gyro 10, the natural bias (i.e. the beat note frequency for the laser at rest) of the laser can be eliminated up to the uncertainty due to the earth rotation rate (0.035°/s).

At beat frequencies close to the lock-in threshold, the waveform is distorted, and there is strong amplitude modulation of each of the counter-rotating pulse trains. The width of the dead band is, as expected, of the order of the pulse length ( i.e. 50 $\mu$m). By feeding an output pulse back to the laser cavity with an adjustable delay, it was confirmed that, for different pulse durations, the width of the dead band is indeed equal to the pulse length.

It is expected for a laser gyro that, at low rotation rates, the gyroscopic response vanishes because of scattering of one beam into the other. If r is the scattering coefficient for the field of one of the laser beams into the counterpropagating laser field, a general upper limit for the lock-in rotation rate $\Omega_c$, is given by:

$$\Omega_c = \frac{rc\lambda}{2A} \qquad (2)$$

A great advantage of a mode-locked laser gyro is the feasibility of introducing intracavity elements without disturbing its gyroscopic response, provided that the inserted elements are not located at the pulse crossing points. The Pockel cell 80 (3 kV for $\lambda/2$ rotation @620 nm) is placed into the optical path 12 at a non-crossing point. An electrical pulse train (pulse duration of 1 ns) from a fast avalanche photodiode 84 detecting one of the laser outputs is applied to the cell 80. With a proper delay line 82, the electrical pulses 30 encounter at the cell with one of the cavity pulses 30. Because the other cavity pulse always arrives at the cell in between the electrical pulses 30, the two counterpropagating cavity pulses 28 and 46 experience different indexes in the cell. Therefore, the bias of the beat frequency 45 of the gyro 10 is modulated by the amplitude and polarity of the electrical pulse 30.

Figure 4:
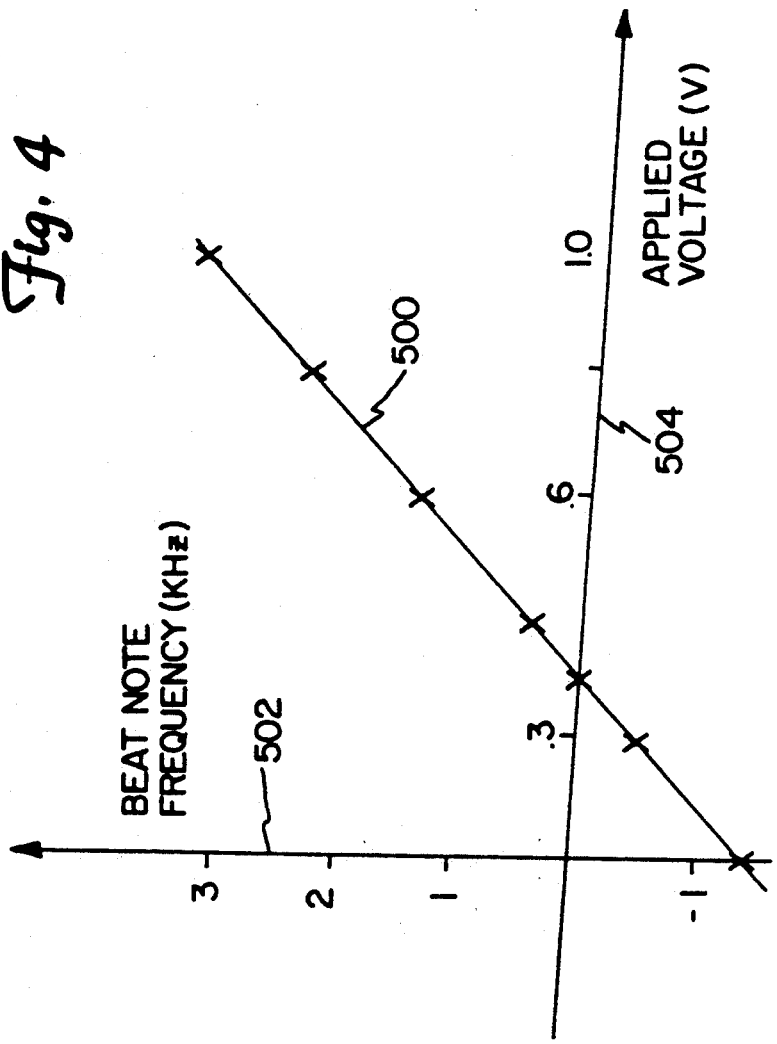
FIG. 4 is a graph of laser gyro beat note versus peak voltage of a detected pulse.

FIG. 4 is a plot of the beat note frequency 45 in KHz on axis 502 against the applied pulse voltage on axis 504, in good agreement with the calculated value from the electro-optical coefficient of the cell 80 shown as solid line 500.

The apparatus of the invention is a very sensitive instrument for anisotropic measurement. Because of the feasibility of adding intracavity optics, the laser is suitable for many applications which are not possible with CW ring lasers. In particular, when a sample is located away from the pulse crossing points, any index change induced by, for instance, an electrical or optical pulse train synchronized with one of the cavity pulses can be measured via the beat frequency. In addition, because the cavity pulse is of 100 fs, the above measurement can have a high time resolution.

Intracavity pump-probe adjustments can be straight-forward. In one alternate embodiment, one of the cavity pulses is used as a pump pulse, and the other, as a probe pulse; the relative delay can be obtained simply by moving the sample away or toward a pulse crossing point.

In one alternate embodiment of the invention the solid state absorber 14 may advantageously comprise a multiple quantum well (MQW) semiconductor device as disclosed, for example by Raja et al. in an article entitled "Novel Wavelength-Resonant Optoelectronic Structure and Its Application To Surface-Emitting Semiconductor Lasers", Electron. Lett., 24:1140–1142, 1988. The multiple quantum well semiconductor device is a saturable absorber. The gain medium 16 may advantageously comprise any well known gain medium. The prisms 24, 32 are optional and are employed in a well known manner for conditioning the beams.

In operation, an external energy source (not shown) provides electrical or other type of appropriate energy E to stimulate the gain medium 16. The stimulation energy E, in this example, is reflected into the gain medium 16 via focusing mirror 18 and the gain medium 16 lases along path 12. Mirrors 20 and 22 may be employed advantageously to direct the laser emission from gain medium 16. The absorber 14 is located between mirrors 54 and 56 which focus the laser emission onto the absorber 14. The absorber 14 creates first and second counterpropagating pulses 28 and 46 respectively. The first pulse 28 propagates in a counter clockwise direction around the path 12 as indicated by arrow 26. The second pulse 46 propagates in a clockwise direction as indicated by arrow 47. In one example of the invention, pulses 46 and 28 comprise pulses each having a pulse duration of about 100 femtoseconds. The pulses propagate around the laser path at a rate of one pulse every ten nanoseconds. The semiconductor absorber 14 is located such that the counterpropagating pulses periodically meet at the middle of the absorber 14. The index of refraction modulator 80 advantageously affects the index of refraction of one of the propagating pulses to change the affected path length. Thus, the lock-in phenomenon, wherein the two laser modes couple together, is avoided.

Those skilled in the art will understand that the type of laser used in the laser gyro 10 of the invention may advantageously be either a dye laser, titanium sapphire laser, or a semiconductor laser. The requirement being that the laser be able to create pulses of short duration such that only pulses propagating in one direction are modulated by the index of refraction modulator 80.

It will be understood by those skilled in the art that the laser path 12 represents any of a plurality of types of laser waveguides. The laser path 12 may advantageously comprise an optical path, a fiber waveguide, a solid state waveguide or other functionally equivalent laser waveguide.

Figure 5:
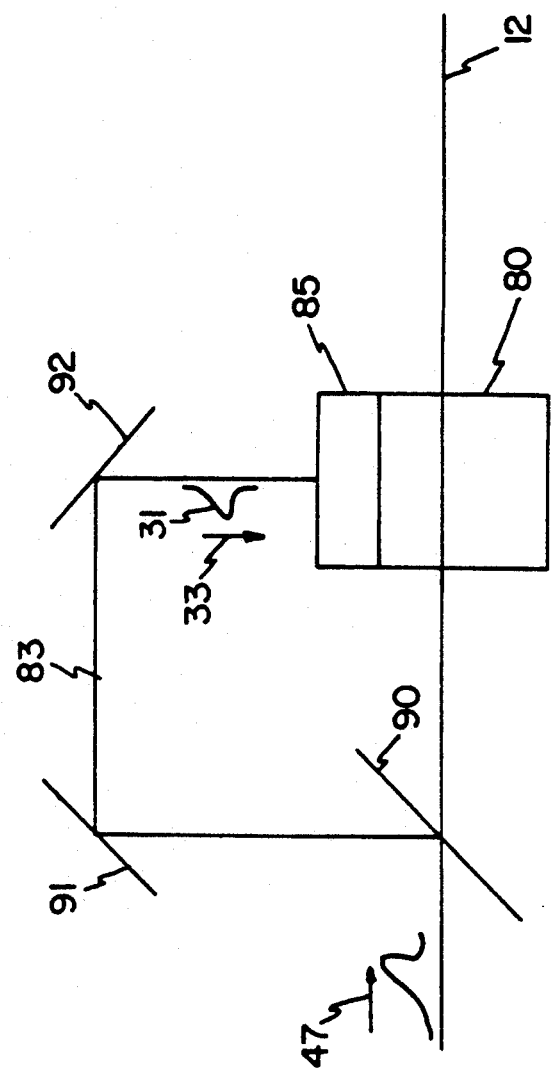
FIG. 5 shows a schematic of an integrated index of refraction varying apparatus as employed in an embodiment of the invention.

Now referring to FIG. 5 which shows an alternative embodiment of the apparatus of the invention used to modulate the index of refraction. The Pockel cell 80 is shown having an integrated sensor 85 which is responsive to propagating pulse 31 in direction of arrow 33. The existence of a pulse 31 causes the sensor 85 to generate a modulating voltage to modulate Pockel cell 80. The pulse 31 is taken from the laser path 12 by mirror 90 reflected to mirror 91, then mirror 92 to integrated detector 85. Those skilled in the art will recognize that other optical waveguides such as fiber optic cables or other mirror configurations may be used to direct the sample pulse 31 from optical path 12. The optical path length from mirror 90 to sensor 85 is controlled such that as pulse two 46 passes through the Pockel cell 80 the index of refraction of the Pockel cell will be increased.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A laser gyro having a laser source of laser energy, comprising:

laser gain means for receiving the laser energy and for generating first and second counterpropagating laser pulses along a common optical path;

control means for detecting at least one of the pulses and for generating an index of refraction control signal representative of the detected at least one pulse;

refraction varying means for varying the index of refraction of a segment of the optical path in response to the index of refraction control signal such that the index of refraction of the segment of the optical path changes an optical path length for at least one laser pulse; and detector means for sensing a beatnote between the first and second propagating laser pulses.

2. A laser gyro according to claim 1, wherein the control means includes a photodiode connected to the refraction varying means, the photodiode generating the index of refraction control signal, the index of refraction control signal being synchronized with at least one laser pulse, wherein the synchronization is tuned by selecting a length of the connection between the photodiode and the refraction varying means.

3. A laser gyro according to claim 2, wherein the photodiode includes an avalanche photodiode.

4. A laser gyro according to claim 3, further including at least one prism positioned along the optical path such that pulse widths of the first and second counterpropagating waves are compressed by the prism.

5. A laser gyro according to claim 1, wherein the control means includes a photodiode connected to the refraction varying means, the photodiode generating the index of refraction control signal, the index of refraction control signal being synchronized with at least one laser pulse, wherein the synchronization is tuned by selecting a distance of the optical path from the photodiode.

6. A laser gyro according to claim 1, wherein the laser pulses once every 10 nanoseconds.

7. A laser gyro according to claim 1, wherein the first and second counterpropagating laser pulses are of a duration between 50 femtoseconds and 150 femtoseconds.

8. A laser gyro according to claim 1, wherein the detector means includes a photodiode.

9. A laser gyro according to claim 1, wherein the refraction varying means includes a Pockel cell.

10. A laser gyro according to claim 9, wherein the Pockel cell includes a crystal.

11. A laser gyro according to claim 9, wherein the Pockel cell includes a semiconductor material.

12. A laser gyro according to claim 9, wherein the Pockel cell includes an electro-optic material.

13. A laser gyro according to claim 9, wherein the control means is integrally connected to the Pockel cell.

14. A laser gyro according to claim 9, wherein the control means includes means for directing a pulse from the optical path to a pulse sensor integrally connected to the Pockel cell, the pulse sensor including means for generating the index of refraction control signal as a modulating voltage to modulate the index of refraction of the Pockel cell, the directing means having an optical path length such that the index of refraction of the Pockel cell is modulated as one of the pulses passes therethrough, whereby the effective path length of each counterpropagating pulse is sufficiently different to avoid lock-in at low relative rotation rates.

15. A laser gyro according to claim 14, further including at least one prism positioned along the optical path such that pulse widths of the first and second counterpropagating waves are compressed by the prism.

16. A laser gyro according to claim 14, wherein the laser pulses occur once every 10 nanoseconds.

17. A laser gyro according to claim 14, wherein the first and second counterpropagating laser pulses are of a duration between 50 femtoseconds and 150 femtoseconds.

* * * * *